(12) United States Patent
Kimura

(10) Patent No.: US 10,153,522 B2
(45) Date of Patent: Dec. 11, 2018

(54) BATTERY PACK

(71) Applicant: TOYOTA JIDOSHA KABUSHIKI KAISHA, Toyota-shi, Aichi-ken (JP)

(72) Inventor: Kenji Kimura, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 20 days.

(21) Appl. No.: 15/044,255

(22) Filed: Feb. 16, 2016

(65) Prior Publication Data

US 2016/0285139 A1  Sep. 29, 2016

(30) Foreign Application Priority Data

Mar. 23, 2015  (JP) .................................. 2015-059304

(51) Int. Cl.
*H01M 10/615* (2014.01)
*H01M 2/10* (2006.01)
*H01M 10/6571* (2014.01)
*H01M 10/625* (2014.01)

(52) U.S. Cl.
CPC ....... *H01M 10/615* (2015.04); *H01M 2/1077* (2013.01); *H01M 10/6571* (2015.04); *H01M 10/625* (2015.04); *H01M 2220/20* (2013.01)

(58) Field of Classification Search
CPC ............ H01M 10/615; H01M 10/625; H01M 10/6571; H01M 2220/20; H01M 2/1077
See application file for complete search history.

(56) References Cited

U.S. PATENT DOCUMENTS

| 2003/0162084 A1 | 8/2003 | Shigeta et al. |
| 2005/0274705 A1* | 12/2005 | Zhu ...................... B60L 3/0046 219/202 |
| 2006/0028183 A1* | 2/2006 | Izawa .................. B60L 3/0046 320/150 |
| 2008/0096072 A1 | 4/2008 | Fukusako et al. |
| 2008/0179315 A1* | 7/2008 | Suzuki .................. H05B 3/286 219/549 |
| 2008/0198897 A1 | 8/2008 | Suzuki et al. |
| 2011/0117419 A1* | 5/2011 | Lee ..................... H01M 2/1077 429/156 |
| 2012/0242291 A1* | 9/2012 | Kimura .................... B60L 1/06 320/126 |

FOREIGN PATENT DOCUMENTS

| CN | 1435909 A | 8/2003 |
| EP | 2 343 769 A1 | 7/2011 |
| JP | 2008-53149 A | 3/2008 |

(Continued)

*Primary Examiner* — Miriam Stagg
*Assistant Examiner* — Victoria H Lynch
(74) *Attorney, Agent, or Firm* — Sughrue Mion, PLLC

(57) ABSTRACT

In a battery pack having one or more battery modules, each battery module includes a plurality of cylindrical batteries, and a battery holder for holding the plurality of cylindrical batteries and forming a space between itself and an adjacent member, the space being at least partially open to the outside and the battery pack further includes a heater mounted in the space, for heating the plurality of cylindrical batteries via the battery holder, and an elastic member for urging the heater onto the battery holder, and closing an opening of the space to thereby form a first space closed from the outside.

6 Claims, 8 Drawing Sheets

(56) References Cited

FOREIGN PATENT DOCUMENTS

| JP | 2008-204708 A | 9/2008 |
| JP | 2010-238554 A | 10/2010 |
| JP | 2012-190760 A | 10/2012 |
| JP | 2012-243535 A | 12/2012 |
| JP | 5392407 B2 | 1/2014 |

\* cited by examiner

BATTERY PACK

PRIORITY INFORMATION

This application claims priority to Japanese Patent Application No. 2015-059304 filed on Mar. 23, 2015, which as incorporated herein by reference in its entirety.

FIELD

The present invention relates to a battery pack having one or more battery modules each including a plurality of cylindrical batteries.

BACKGROUND

A battery pack in which many batteries are connected in serial or parallel is used in an electric vehicle or the like. Such a battery pack has a problem in that an output and a rechargeable capacity thereof decrease at low temperature. To address the above, there has been conventionally suggested provision of a heater to a battery pack so as to heat the respective batteries when the temperature is low.

For example, Patent Document 1 discloses a technique for heating a cylindrical battery, using a sheet-like heater, in a battery pack including a plurality of cylindrical batteries and a battery holder wherein battery storage spaces for storing the plurality of cylindrical batteries are individually defined, the sheet-like heater being mounted between the inner surface of the battery storage space and the outer surface of the cylindrical cal battery.

Patent Document 2 discloses a battery pack structure having a plurality of rectangular batteries, a case having a separating part separated from the rectangular batteries, for storing the plurality of rectangular batteries, and a heater mounted on the outer surface of the separating part, and a technique for heating the rectangular batteries via the air present between the separating part and the battery section.

Patent Document 3 discloses a technique for heating a cylindrical battery, using a heater secured on a side surface of a battery holder, in a battery pack including a plurality of cylindrical batteries and a metallic battery holder for holding the plurality of respective cylindrical batteries.

CITATION LIST

Patent Literature

Patent Document 1: JP 2012-243535 A
Patent Document 2: JP 2008-053149 A
Patent Document 3: JP 5392407 B However, in a case where a heat generator is mounted in contact with each battery, as in Patent Document 1, a significantly increased component cost results. Meanwhile, although increase of component cost can be prevented in Patent Document 2, provision of a separating part may result in an enlarged case, and thus an enlarged battery pack. Another problem of Patent Document 2 is that heating takes time, as heat from a heater is transferred to a battery via air. In Patent Document 3, as a heater is secured on a metallic battery holder and a cylindrical battery is heated via the metallic battery holder, it is not necessary to provide a separating part to a battery holder or a case, which can prevent enlargement in the size of a case. In addition, it is possible to quickly heat a battery, as the battery is heated via a metallic battery holder.

However, in Patent Document 3, although one surface of the heater is in contact with the battery holder, the other surface is exposed to the outside. Accordingly, heat from the heater is partially discharged to the outside space before being transferred to the battery holder or the cylindrical battery. This results in a problem of deteriorated heating efficiency.

In order to address the above, the present invention aims to provide a battery pack capable of more efficiently heating a plurality of cylindrical batteries while preventing increase in the cost and the size of the battery pack.

SUMMARY

A battery pack according to the present invention is a battery pack having one or more battery modules, in which each battery module includes a plurality of cylindrical batteries, and a battery holder made of heat conductive material, for holding the plurality of cylindrical batteries and forming a space between itself and an adjacent member, the space being at least partially open to the outside; and the battery pack further has a heater mounted in the space, for heating the plurality of cylindrical batteries via the battery holder, and an elastic member for urging the heater onto the battery holder, and closing an opening of the space to thereby form a first space closed from the outside.

In a preferred embodiment, the adjacent member may be another battery module, and the elastic member may urge the heater onto battery holders of two respective adjacent battery modules. In another preferred embodiment, the elastic member may have a hollow cylindrical shape having a second space formed thereinside.

In another preferred embodiment, the elastic member may have a lip projecting to outside from an outer surface thereof, and the elastic member may be mounted with the lip hooked in a concave formed on the battery module. In another preferred embodiment, the heater may be a sheet heater formed by securing a wire heat generator onto a sheet member, and the elastic member may be mounted in the space with an outer surface thereof partially covered by the sheet heater.

According to the present invention, as a heater and an elastic member are mounted in a space formed between a battery holder and an adjacent member, it is unnecessary to ensure a space dedicated to the heater or the like, which can prevent increase in the size and cost. Further, as the heater is urged onto the battery holder and a first space closed from the outside is formed, it is possible to quickly transfer heat from the heater to the battery holder, and to prevent heat from the heater from escaping to the outside. As a result, it is possible to more efficiently heat a plurality of cylindrical batteries.

BRIEF DESCRIPTION OF DRAWINGS

Preferred embodiments will be described in detail by reference to the following figures, wherein.

DETAILED DESCRIPTION

Figure 1:
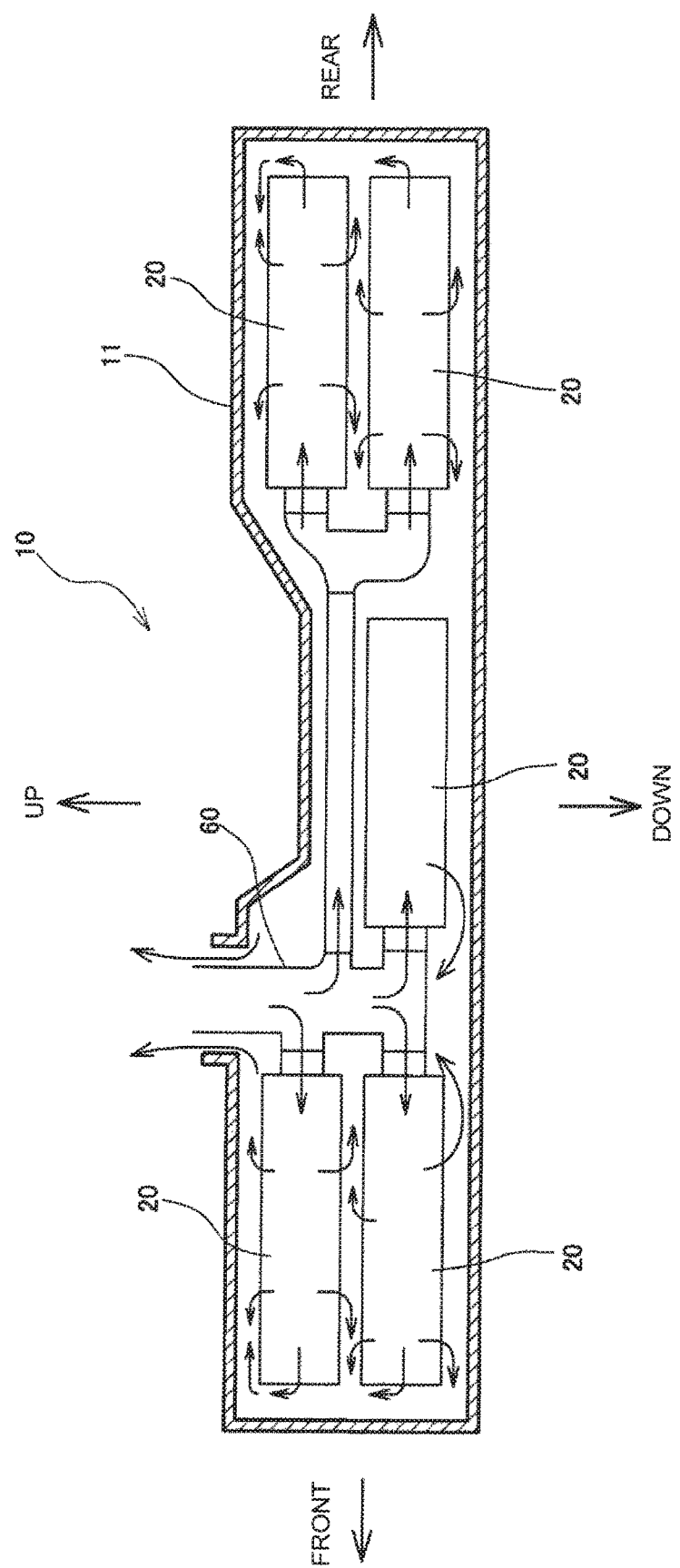
FIG. 1 is a schematic vertical cross sectional view showing a structure of a battery pack according to an embodiment of the present invention.
Figure 2:
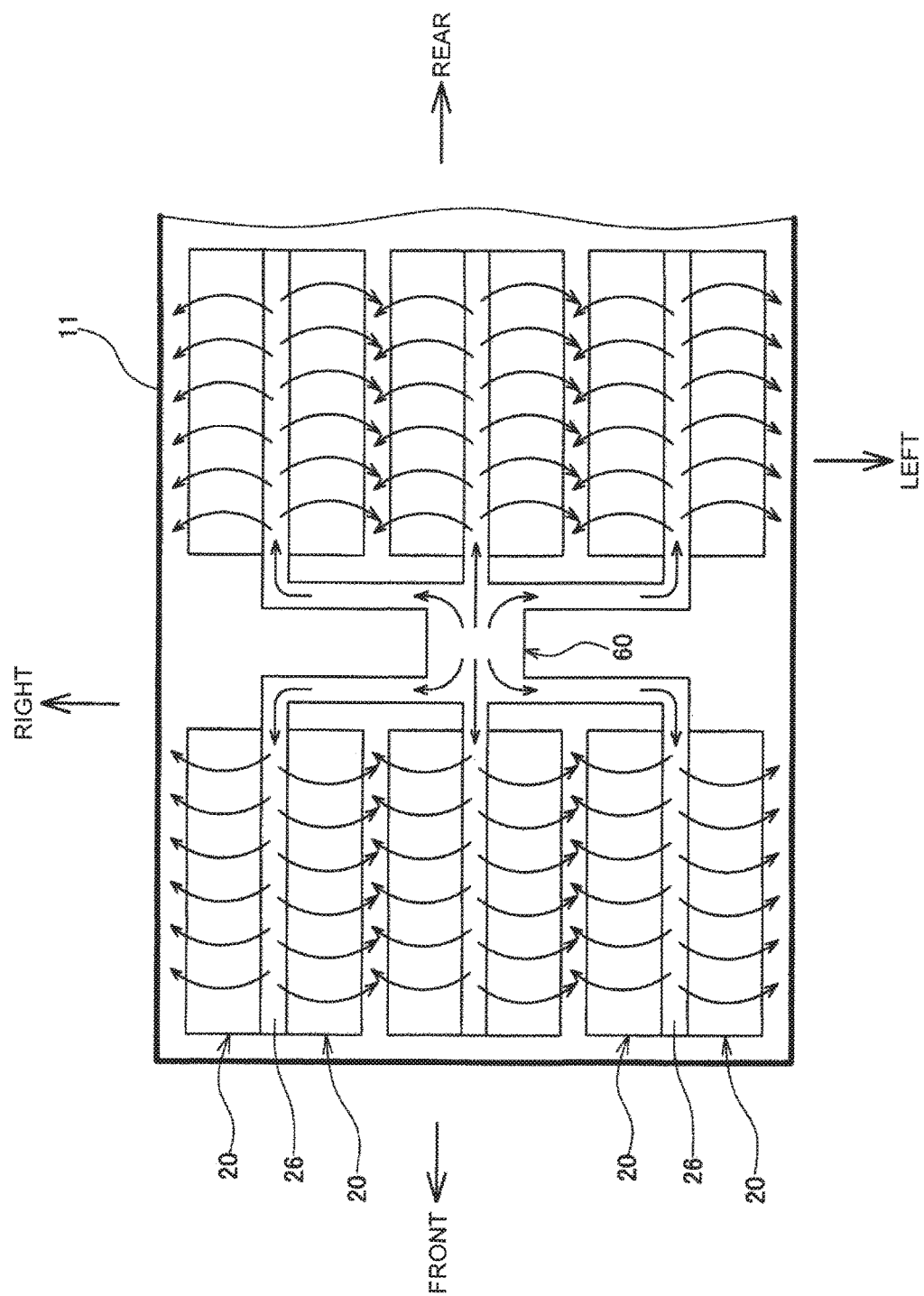
FIG. 2 is a schematic horizontal cross sectional view of a battery pack.
Figure 3:
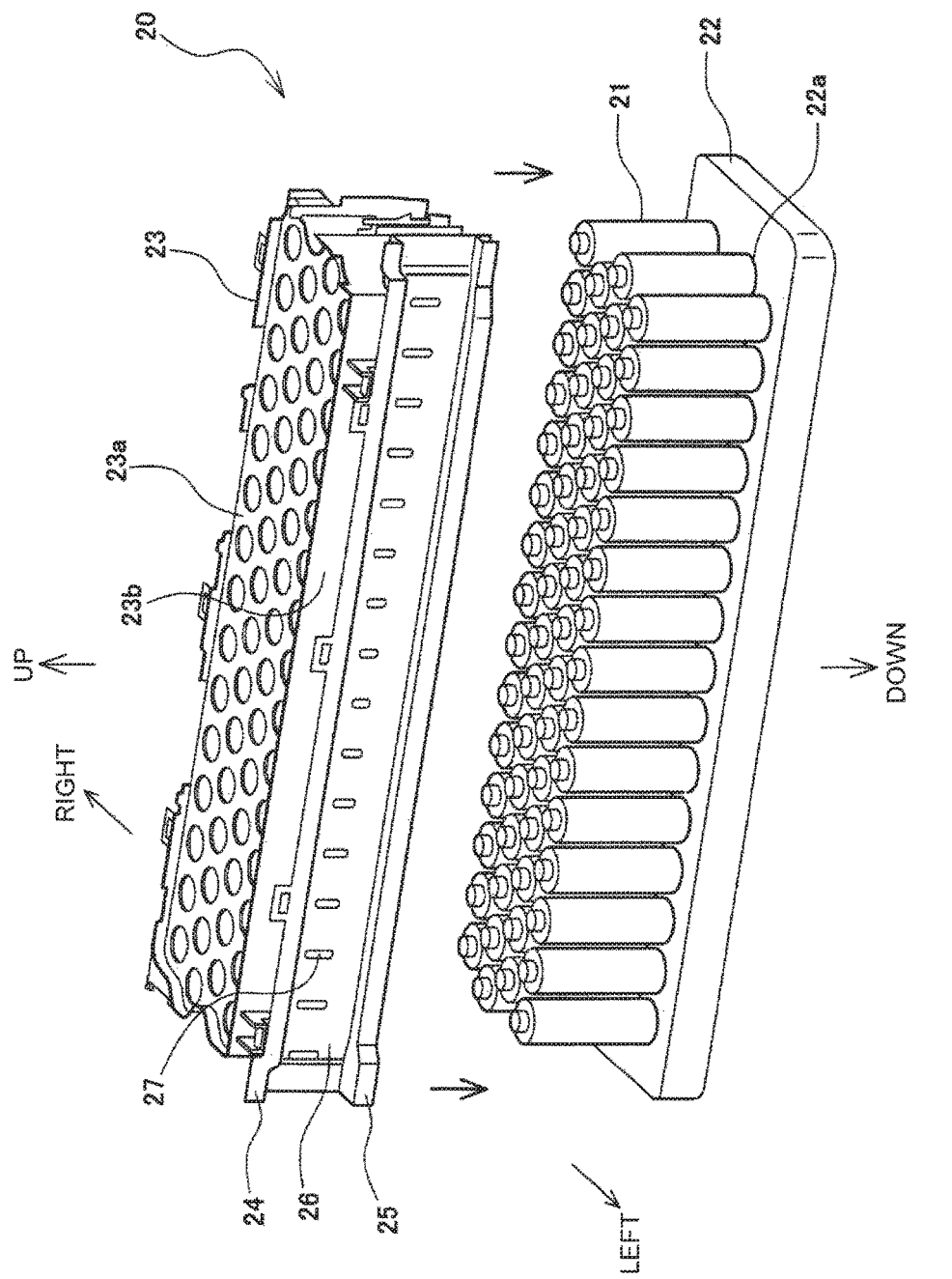
FIG. 3 is an exploded perspective view of a battery module.
Figure 4:
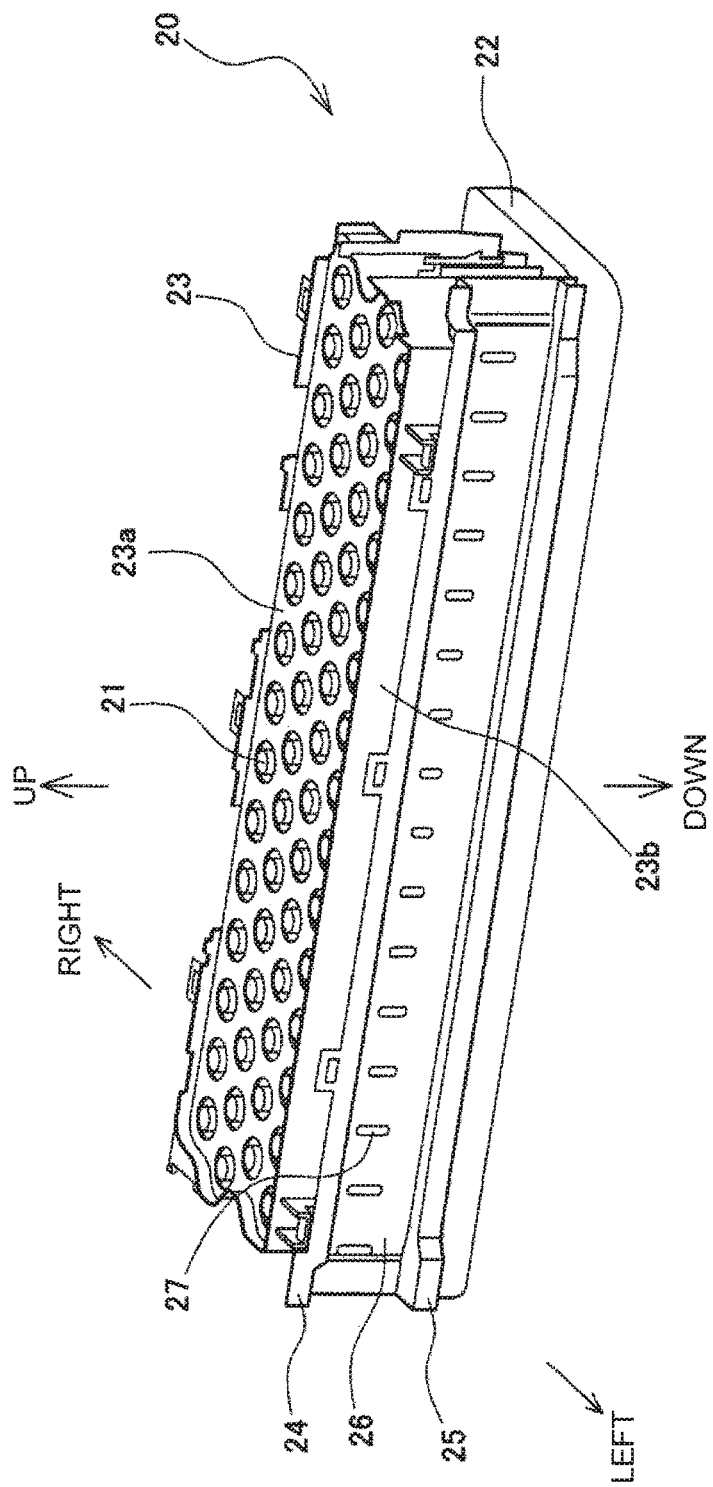
FIG. 4 is a perspective view of a battery module.
Figure 5:
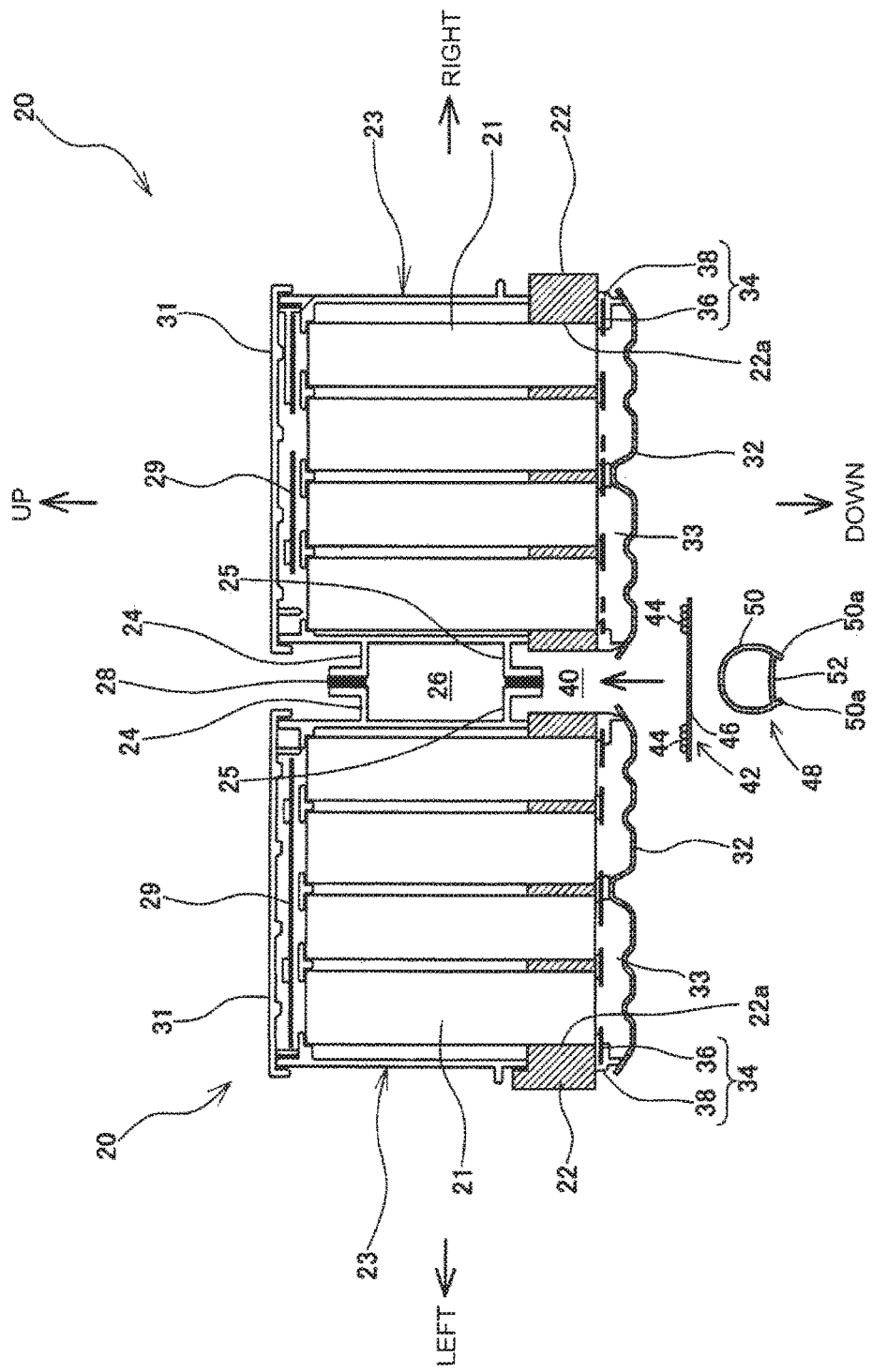
FIG. 5 is a cross sectional view of a battery module before a heater is mounted.
Figure 6:
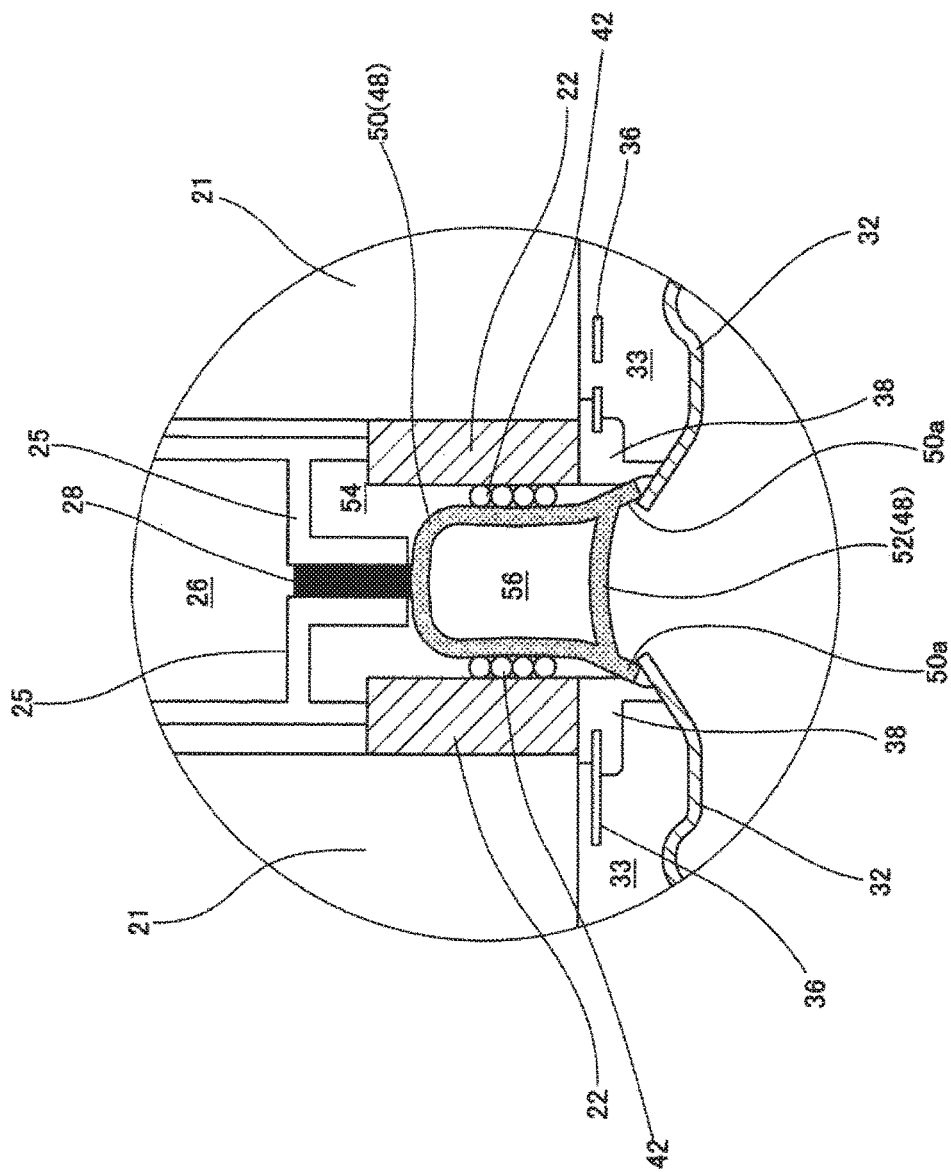
FIG. 6 is an enlarged diagram showing an area around where a heater is mounted.

In the following, an embodiment of the present invention will be described with reference to the drawings. FIG. 1 is a schematic vertical cross sectional view showing a structure of a battery pack 10 according to an embodiment of the present invention; FIG. 2 is a schematic horizontal cross sectional view of the battery pack 10. FIG. 3 is an exploded perspective view of a battery module 20; FIG. 4 is a perspective view of the battery module 20. FIG. 5 is a cross sectional view of a battery module before a heater is mounted; FIG. 6 is an enlarged diagram showing an area around where a heater is mounted. As will be described later, each battery module 20 has a substantially rectangular parallelepiped shape. In the following, in order to clarify directional relationship, the longitudinal direction of the battery module 20 will be referred to as a "front-back direction," the axial direction of each cylindrical battery 21 as an "up-down direction" or a "height direction," and a direction orthogonal to the front-back direction and the up-down direction as a "left-right direction" or a "width direction."

The battery pack 10 comprises a plurality of battery modules 20, and a casing 11 for accommodating the battery modules 20. Each battery module 20 includes a plurality of cylindrical batteries. The top surface of the casing 11 has an uneven shape with a middle part thereof indented. The shape and size of the casing 11, however, may be arbitrarily modified in accordance with a space where the battery pack 10 is mounted or the number of battery modules 20 accommodated therein.

As shown in FIG. 5, one battery module 20 has a substantially rectangular parallelepiped shape having a square cross section of substantially equal width and height. As shown in FIGS. 1 and 2, battery modules 20 are aligned in the casing 11 in three rows in the front-back direction and six rows in the left-right width direction. Further, as shown in FIG. 1, the battery modules 20 in the first and third rows in the front-back direction are stacked in two layers in the up-down direction. That is, thirty battery modules 20 in total, are mounted, including eighteen battery modules 20 in the lower layer of the battery pack 10 of this embodiment; specifically, three rows in the front-back direction and six rows in the width direction, and twelve battery modules 20 in the upper layer; specifically, two rows in the front-back direction and six rows in the width direction. The number and arrangement of these battery modules 20, however, may be desirably modified.

As shown in FIG. 2, a duct 60 is formed between the battery modules 20 aligned in the casing 11, for distributing cooling air having been introduced into the inside of the battery pack 10 to the respective battery modules 20. The duct 60 is arbitrarily branched to be linked to a cooling air channel 26 to be described later.

Two battery modules 20 aligned in the width direction form a pair, and the cooling air channel 26 is formed between the two battery modules 20 forming a pair. Therefore, the cooling air channel 26 of the battery module 20 is formed at three positions in the width direction (the left-right direction), and the duct 60 extends from up to down and then is forked into three in the horizontal direction.

In the following, a structure of each battery module 20 will be described by reference to FIGS. 3 to 5. As shown in FIG. 3, the battery module 20 includes a plurality of cylindrical batteries 21, a battery holder 22 for holding the plurality of cylindrical batteries 21, and a resin cover 23. Each cylindrical battery 21 is a rechargeable secondary battery, being a nickel-metal hydride battery, a lithium ion battery, or the like, for example, accommodated in a cylindrical case.

The battery holder 22 is a member for holding upright the plurality of respective cylindrical batteries 21. The battery holder 22 is a panel member made of metal that is superior in heat conductivity, such as aluminum or the like, for example, and has many through holes 22a formed therein into each of which a lower part of the cylindrical battery 21 is inserted. To assemble the cylindrical battery 21 into the battery holder 22, the cylindrical battery 21 is inserted into the through hole 22a, and an adhesive member is filled in the space between the inner surface (a cylindrical surface) of the through hole 22a and the out surface (a cylindrical surface) of the cylindrical battery 21 to thereby secure the cylindrical battery 21 in the through hole 22a. With the above, the battery holder 22 can contact, or remain near, all of the plurality of cylindrical batteries 21. Then, when the cylindrical battery 21 is inserted into the through hole 22a of the battery holder 22, as described above, it is possible to lower the temperature of a part at high temperature of the cylindrical battery 21 by transferring heat at the high-temperature part of the cylindrical battery 21 to the battery holder 22 by means of heat transfer, and also to increase the temperature of a part at low temperature of the cylindrical battery 21 by transferring heat from the battery holder 22 to the low-temperature part of the cylindrical battery 21 by means of heat transfer. That is, each cylindrical battery 21 is held in each through hole 22a such that heat transfer between the cylindrical battery 21 and the battery holder 22 is possible, so that variation in the temperature of the respective cylindrical batteries 21 can be prevented by the battery holder 22. For this purpose, the battery holder 22 is made of metal, such as aluminum or the like, having high heat conductivity so that heat can be efficiently transferred between the respective cylindrical batteries 21. Further, the thickness of the battery holder 22, is defined to such a thickness that enables holding of the cylindrical battery 21 by the cylindrical surface of the through hole 22a, and efficient heat transfer by means of heat transfer. Specifically, the thickness is defined to, for example, about 10 to 20 mm, or about a quarter of the length of the cylindrical battery 21.

The resin cover 23 includes a top panel 23a having a top surface where holes are formed, through each of which an electrode of each cylindrical battery 21 projects, and a rectangular enclosure 23b for covering the outer surface of the plurality of cylindrical batteries 21 mounted in the battery holder 22. On both surfaces of the rectangular enclosure 23b in the width direction, a plurality of slits 27 are formed. Further, on one surface of the rectangular enclosure 23b in the width direction, flanges 24, 25, each having a substantially L-shaped cross section, are formed on the upper and lower respective sides of the slit 27. The flanges 24, 25 are formed on only one surface of the rectangular enclosure 23b in the width direction. For example, in the example shown in FIGS. 3 and 4, the flanges 24, 25 are formed on the left side surface but not on the right side surface (not shown). The upper flange 24 extends in the horizontal direction, and then in the vertically upward direction, while the lower flange 25 extends in the horizontal direction and then in the vertically downward direction. When the cover 23 is attached to the battery holder 22, the electrodes of the respective cylindrical batteries 21 project from the respective holes formed on the top panel 23a of the cover 23, as shown in FIG. 4.

As shown in FIG. 5, a cathode bus bar 29 is provided above the holes of the cover 23, for connecting the upper electrodes (cathode) of the respective cylindrical batteries 21, and a resin cap 31 is provided above the cathode bus bar 29. Meanwhile, an anode bus bar 34 is provided below the battery holder 22, for connecting the lower electrodes (anode) of the respective cylindrical batteries 21. The anode bus bar 34 includes a metal bus bar 36 in contact with the anodes of the respective cylindrical batteries 21, and a resin panel 38 for holding the metal bus bar 36. On the resin panel 38, a through hole is formed at a position corresponding to each cylindrical battery, so that the anode of the cylindrical battery 21 is exposed downward.

Below the anode bus bar 34, a discharge chamber cover 32 is provided. The discharge chamber cover 32 has a substantially dish-like shape that is dented downward. A peripheral part of the discharge chamber cover 32 is secured on the resin panel 38, and a discharge chamber 33, or a closed space, is formed between the discharge chamber cover 32 and the battery holder 22. An opening (not shown) is formed on the resin panel 38, for communication between the discharge chamber 33 and the outside space. When gas is generated due to abnormal reaction of the cylindrical battery 21, the gas is discharged into the discharge chamber 33, and then from the discharge chamber 33 to the outside through the opening.

As shown in FIG. 5, as to the battery module 20 on the right side, the flanges 24, 25 are formed on the left side surface of the resin cover 23. Meanwhile, as to the battery module 20 on the left side, the flanges 24, 25 are formed on the right side surface of the cover 23. The two left and right battery modules 20 are assembled such that the vertical surfaces of the respective flanges 24, 25 are placed face to face. An elastic seal member 28, such as rubber, sponge, or the like, is inserted between the respective vertical surfaces of the flanges 24, 25. When two battery modules 20 are assembled such that the vertical surfaces of the respective flanges 24, 25 are placed face to face, as described above, the left side surfaces and the right side surfaces of the respective flanges 24, 25 and the respective covers 23 together define the rectangular cooling air channel 26.

The cooling air channel 26 is formed at the substantial middle in the height direction of the battery module 20, so that a space surrounded by two battery modules 20 is left above and below the cooling air channel 26. Specifically, a lower space 40 formed below the cooling air channel 26 is surrounded by the outer surfaces of the battery holders 22 and the outer surfaces of the flanges 25, and open downward, as shown in FIG. 5. A bracket (not shown) made of resin or the like is provided to each of the front and rear ends of the battery module 20, so that the front and rear ends of the lower space 40 are closed by the respective brackets. That is, the lower space 40 is a space that is open only downward.

Note that such a battery module 20 is often used outdoors, and thus may be cooled to lower temperature depending on the environment temperature. When the temperature is excessively low, the battery pack 10 and thus the cylindrical battery 21 accommodated in the battery pack 10 may have a problem, such as a decreased output, deteriorated rechargeable capacity, or the like. To address the above, a heater for heating the cylindrical battery 21 is provided in this embodiment. This will be described with reference to FIGS. 5 and 6.

In this embodiment, a heater 42 for heating the cylindrical battery 21 is placed in the lower space 40 formed between adjacent battery holders 22. More specifically, in this embodiment, a wire heat generator 44, such as a heat wire, is secured on a sheet member 46, such as a heat resisting cloth or the like, to form a sheet heater 42. This sheet heater having such a structure is urged to closely contact the outer surface of the battery holder 22 by an elastic member 48.

The elastic member 48 is made of resin or the like having thermal insulation properties and elasticity. The form of the elastic member 48 is not limited to any specific form, so long as the resultant elastic member 48 can keep the sheet heater 42 closely contacting the battery holder 22, and close the opening of the lower space 40. In this embodiment, a substantially cylindrical hollow extruded member is used as the elastic member 48. More specifically, the elastic member 48 includes a C-shaped portion 50 that is curved like the shape of the letter C, and a connection portion 52 for connecting parts near the respective ends of the C-shaped portion 50. Each of the respective end portions of the C-shaped portion 50 forms a lip 50a projecting outward from the connection portion 52. The outer diameter of the elastic member 48 with no load applied is larger than the width of the lower space 40.

In mounting the sheet heater 42 in the lower space 40, the elastic member 48 is mounted in the lower space 40, together with the sheet heater 42 covering the outer surface of the C-shaped portion 50 of the elastic member 48 and the connection portion 52 of the elastic member 48 directed downward. As the outer diameter of the elastic member 48 with no load applied is larger than the width of the lower space 40, the elastic member 48, when mounted in the lower space 40, is deformed in accordance with the width of the lower space 40, and, due to an elastic restoring force thereof, forces the sheet heater 42 placed on the outer surface thereof onto the outer surfaces of the battery holders 22 that define the lower space 40. With the above, the lower space 40 is closed by the elastic member 48, and resultantly, a first space 54 isolated from the outside is formed. In addition, a second space 56 isolated from the outside is also formed inside the elastic member 48. The front and rear ends of the second space 56 formed inside the elastic member 48 are open before the elastic member 48 is assembled to the battery module 20, but closed by the brackets mounted on the front and rear ends of the respective battery modules 20 when the elastic member 48 is assembled to the battery modules 20.

The pair of lips 50a projecting from the elastic member 48 are hooked in concaves formed on the respective battery modules 20. That is, a concavity is resultingly open upward on the end portion of the battery module 20, as the end portion of the discharge chamber cover 32 slightly projects from the end of the resin panel 38 constituting the anode bus bar 34. With the lip 50a hooked in the concavity, it is possible to prevent unintentional release of the elastic member 48 and thus the sheet heater 42 from the lower space 40.

As is obvious from the above description, in this embodiment, the sheet heater 42 is mounted in the lower space 40 in order to heat the plurality of cylindrical batteries 21. Note that the lower space 40 is a space that is inevitably formed between two battery modules 20 when the cooling air channel 26 is formed. Conventionally, the lower space 40 is left as a dead space with no member mounted therein. When the heater 42 for heating the cylindrical battery 21 is mounted in the lower space 40, or a dead space, it is possible to mount a heater without newly ensuring a space for the heater and thus without increasing the size of the battery pack 10.

Further, in this embodiment, heat from the heater 42 is quickly transferred to the battery holder 22, as the heater 42 is in close contact with the batter holder 22. As the battery holder 22 is made of metal superior in heat conductivity, as described above, heat from the heater 42 is transferred constantly to the plurality of cylindrical batteries 21 via the battery holder 22. In other words, mounting the heater 42 so as to closely contact the battery holder 22 enables quick and constant heating of the plurality of cylindrical batteries 21.

Further, in this embodiment, the opening of the lower space 40 is closed by the elastic member 48 for urging the sheet heater 42 onto the battery holder 22, whereby the first space 54 isolated from the outside is formed. The thus formed first space 54 can efficiently prevent discharge of heat from the sheet heater 42 to the outside. That is, the elastic member 48 in this embodiment is made of resin or the like superior in heat insulation, as described above. Closing the lower space 40 by the elastic member 48 can efficiently prevent escape, to the outside of the lower space 40, of the heat generated by the heater 42 mounted in the lower space 40. As a result, heat from the heater 42 can be efficiently transferred to the battery holder 22. Further, not only the first space 54 but also the second space 56 are formed in this embodiment. This can efficiently prevent discharge of heat from the heater 42 to the outside, and thus can improve efficiency in using heat from the heater 42.

Note that the above-described structure is an example, and a structure other than a structure in which the elastic member 48 for closing a space resultingly adjacent to the battery holders 22 urges the heater 42 onto the battery holders 22 can be arbitrarily employed. For example, although, in this embodiment, the lower space 40 where a heater is mounted is formed between two adjacent battery modules 20, there may be a case in which the battery module 20 is mounted by itself, depending on a space where the battery pack 10 is mounted or a required battery capacity. In this case, it is desirable that the shape of the flanges 24, 25 formed on the cover 23 may be accordingly changed, or any member is mounted adjacent to the battery module 20 to thereby form a space adjacent to the battery module 20, and that the heater 42 and the elastic member 48 are mounted in the space.

Figure 7:
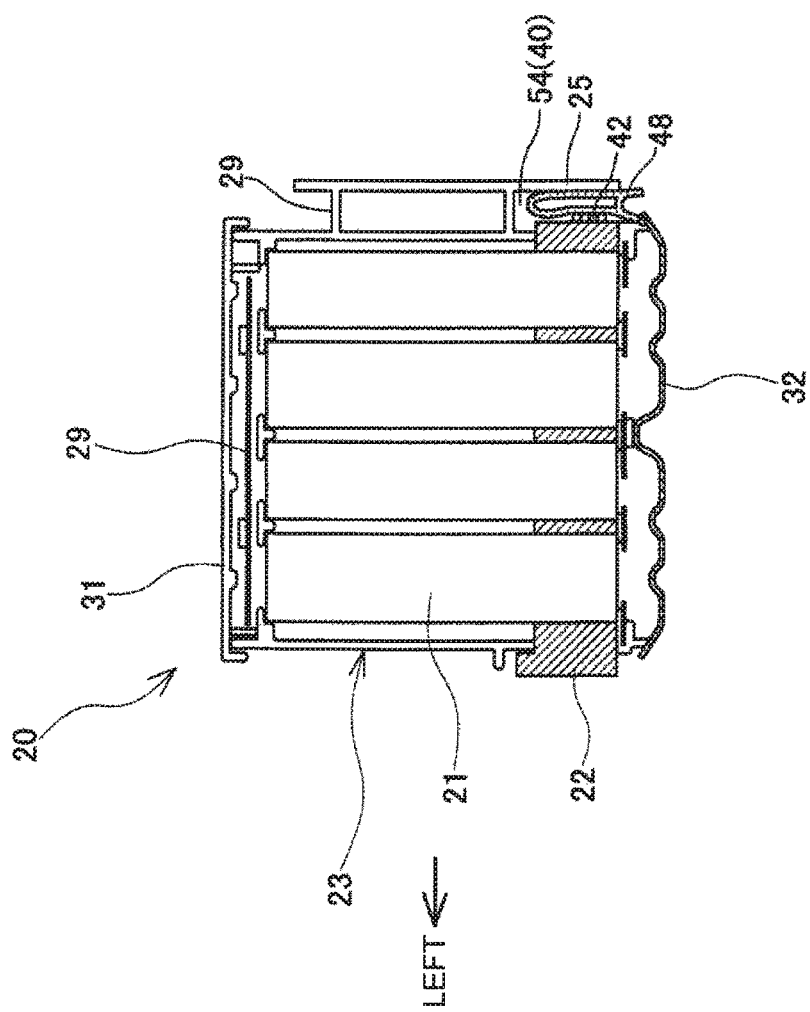
FIG. 7 is a cross sectional view of another battery module.

For example, as shown in FIG. 7, the vertical surface of the flange 25 projecting from a side surface of the cover 23 may be formed extending to the height of the lower end of the battery holder 22 to thereby form a space 40 open downward adjacent to the battery holder 22. With this structure as well, it is possible to prevent discharge of heat from the heater 42 to the outside by urging the heater 42 onto the battery holder 22, using the elastic member 48 mounted in the space 40, and thus to efficiently heat the plurality of cylindrical batteries 21.

Figure 9:
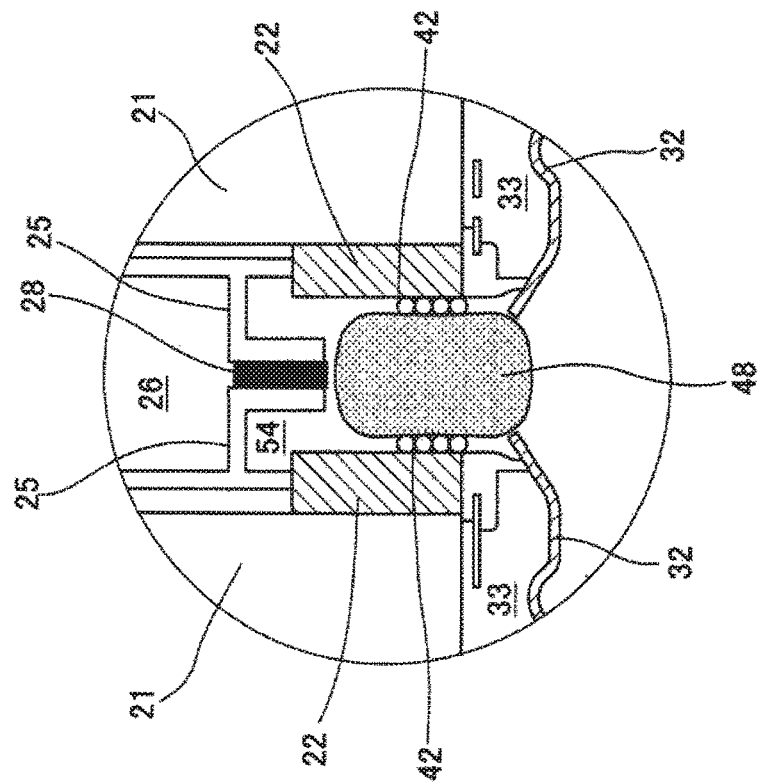
FIG. 9 is an enlarged diagram showing an area around where a heater of another battery module is mounted.
Figure 8:
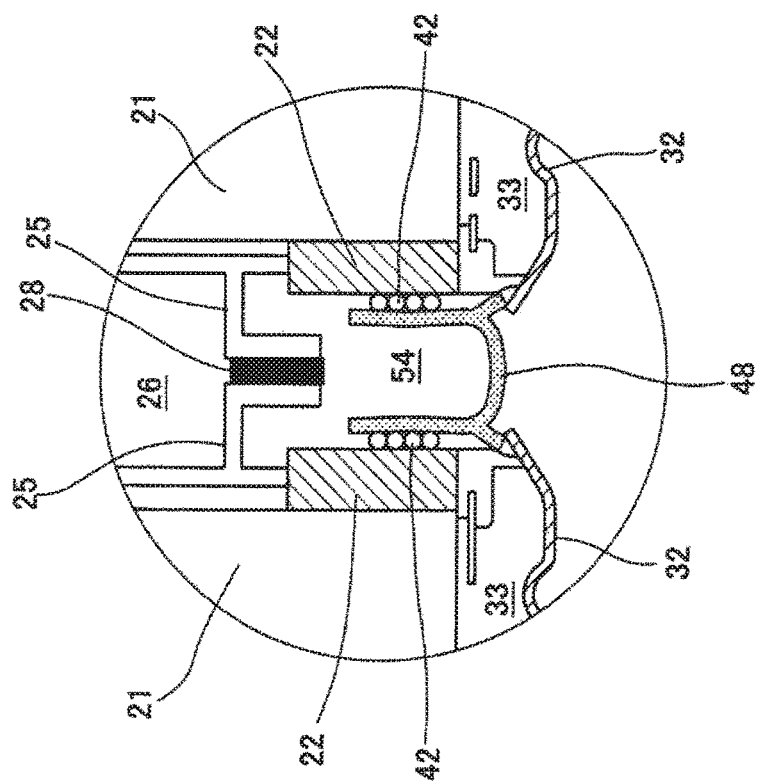
FIG. 8 is an enlarged diagram showing an area around where a heater of another battery module is mounted.

Further, although, in this embodiment, a substantially cylindrical hollow elastic member 48 is used, the elastic member 48 is not necessarily hollow, so long as the resultant elastic member 48 can close at least the opening of the space 40. For example, the cross section of the elastic member 48 may be substantially U-shaped or C-shaped, as shown in FIG. 8, and the elastic member 48 may be solid and substantially bar-shaped, as shown in FIG. 9. The lip 50*a* may be omissible so long as it is possible to prevent release of the elastic member 48. Although the sheet heater 42 formed by securing the wire heat generator 44 on the sheet member 46 is used in this embodiment, the heater 42 may be in a different form so long as the resultant heater 42 can be positioned between the elastic member 48 and the battery holder 22. For example, the heater 42 may be formed using only the wire heat generator 44, with the sheet member 46 omitted.

The invention claimed is:

1. A battery pack having one or more battery modules, wherein
    each battery module includes
    a plurality of cylindrical batteries, and
    a battery holder made of heat conductive material, configured to hold the plurality of cylindrical batteries and to form a space between itself and an adjacent member, the space being at least partially open to the outside; and
    the battery pack further has
    a heater mounted in the space and configured to heat the plurality of cylindrical batteries via the battery holder, and
    an elastic member configured to urge the heater onto the battery holder, and configured to close an opening of the space thereby forming a first space closed from the outside.

2. The battery pack according to claim 1, wherein
    the adjacent member is another battery module, and
    the elastic member urges the heater onto battery holders of two respective adjacent battery modules.

3. The battery pack according to claim 1, wherein the elastic member has a hollow cylindrical shape having a second space formed thereinside.

4. The battery pack according to claim 2, wherein the elastic member has a hollow cylindrical shape having a second space formed thereinside.

5. The battery pack according to claim 1, wherein
    the elastic member has a lip projecting to the outside from an outer surface of the elastic member, and
    the elastic member is mounted in the space with the lip hooked in a concavity formed on an outside of the battery module.

6. The battery pack according to claim 1, wherein
    the heater is a sheet heater formed by securing a wire heat generator onto a sheet member, and
    the elastic member is mounted in the space with an outer surface of the elastic member partially covered by the sheet heater.

\* \* \* \* \*